April 23, 1935.  M. GARBELL  1,998,715
CHECK WRITER
Filed Sept. 8, 1932  6 Sheets-Sheet 1

Inventor:
Max Garbell.
By
Atty.

April 23, 1935.  M. GARBELL  1,998,715
CHECK WRITER
Filed Sept. 8, 1932   6 Sheets-Sheet 3

Inventor
Max Garbell

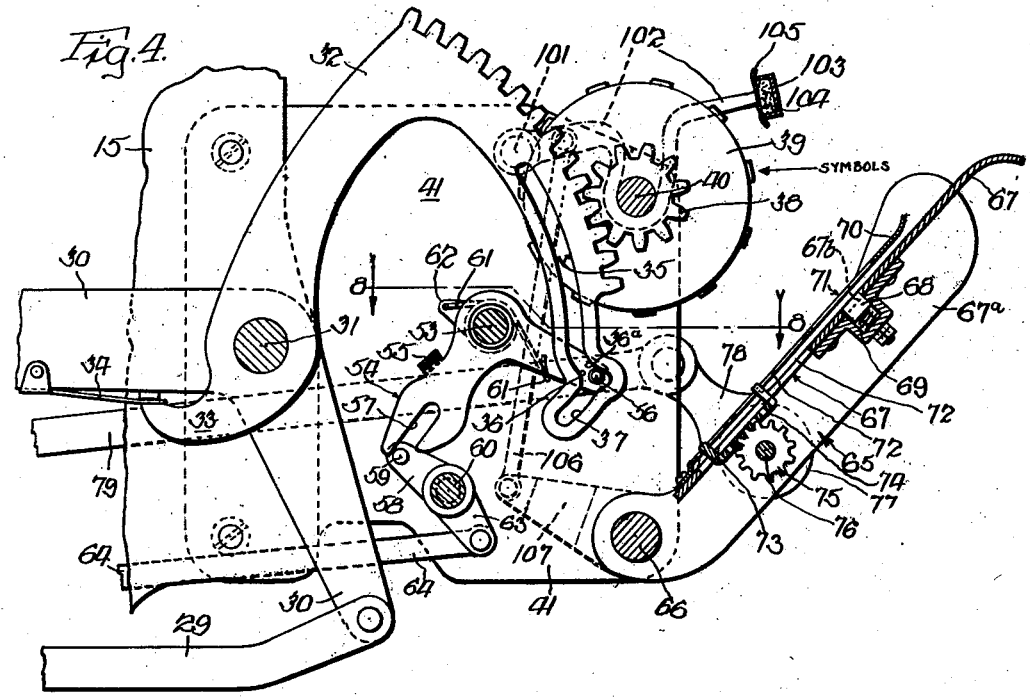

April 23, 1935.                M. GARBELL                 1,998,715
                              CHECK WRITER
                         Filed Sept. 8, 1932          6 Sheets-Sheet 5
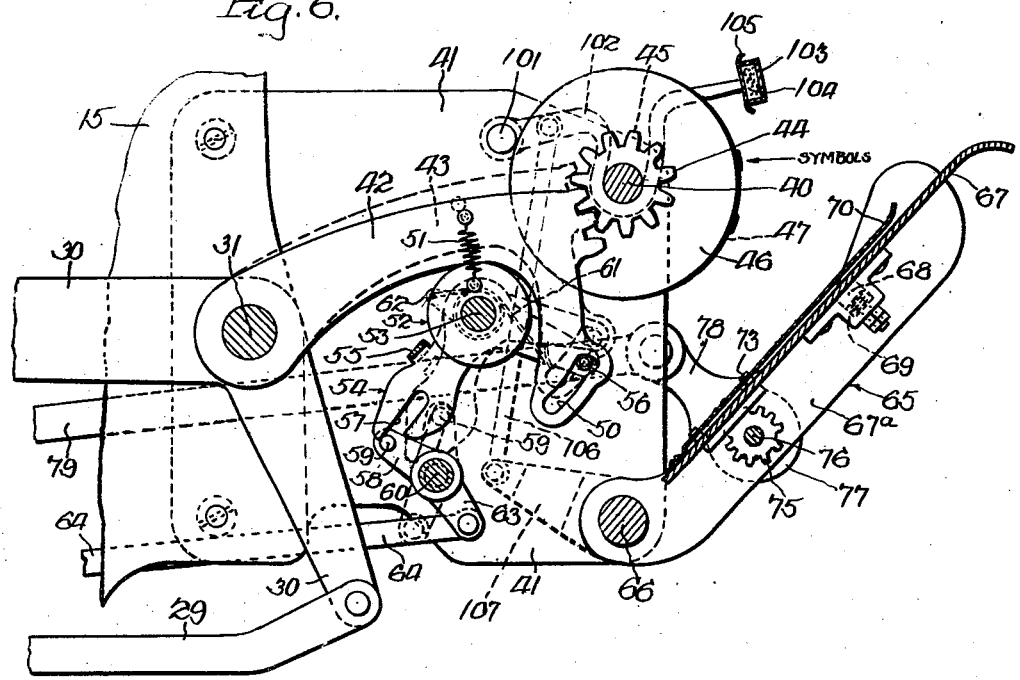
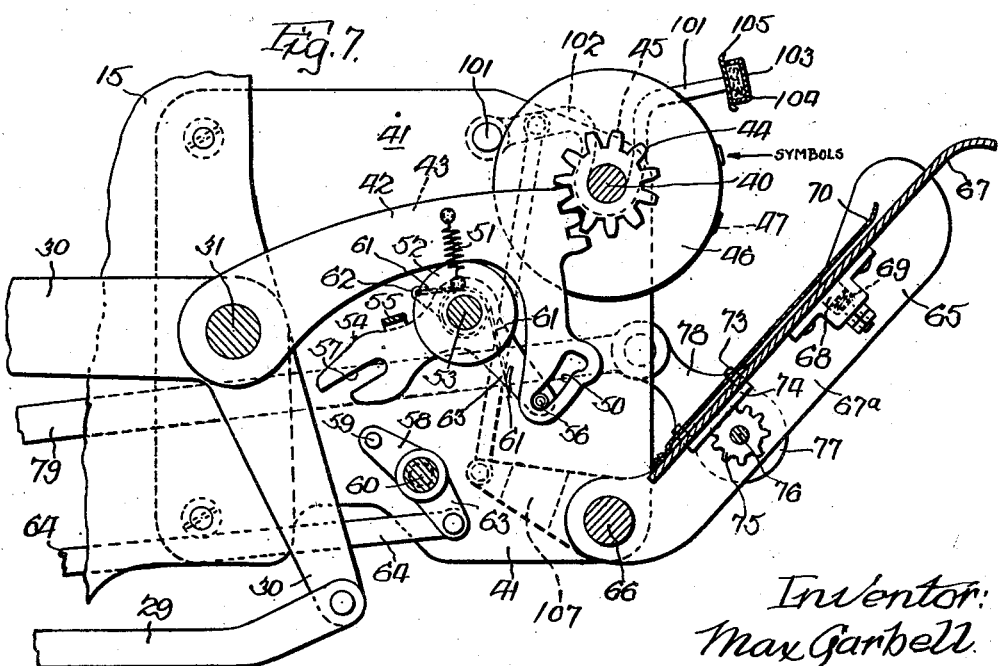

April 23, 1935.  M. GARBELL  1,998,715
CHECK WRITER
Filed Sept. 8, 1932   6 Sheets-Sheet 6

ANY BANK
ANYWHERE            193
PAY TO THE
ORDER OF                $
PAY***1030DOLLARS AND 24CENTS

ANY BANK
ANYWHERE            193
PAY TO THE
ORDER OF                $
PAY**************ONLY 24CENTS

Inventor:
May Garbell
By [signature] Atty.

Patented Apr. 23, 1935

1,998,715

UNITED STATES PATENT OFFICE 1,998,715

CHECK WRITER

Max Garbell, Chicago, Ill., assignor to Victor Adding Machine Company, Chicago, Ill., a corporation of Delaware Application September 8, 1932, Serial No. 632,163

30 Claims. (Cl. 101—93)

This invention relates to improvements in check-protectors, check-writers and more particularly to the key-actuated type utilizing a general operator for setting up the key-selected type and printing the same upon the face of a check, draft or other negotiable instrument. I shall use the word "check" herein to designate any such instruments.

It is often found desirable to print the same on a number of checks and while doing so, and also when printing checks with different amounts, to record the successive totals of the checks printed and also the final total of all the checks. Accordingly, I have shown the check-printing features of the invention as an attachment to an adding machine of a well-known type, the actuating parts being attached to certain parts of the machine and the recording and totalizing features of the machine serving, in connection with my attached improvements, to enable the operator to imprint upon a check the amount set up by means of the keys of the adding machine in the same operation as that of the machine. I may thus use much that is necessary in an office, namely the adding machine, without supplying that part of the machine as a whole. When it is desirable to print a number of checks of the same denomination, the repeat key of the adding machine is actuated in the same usual way and the check-writer attachment will operate in the corresponding manner. The clearing bar or total key and the non-add key also actuate the attachment as well as the adding machine.

The chief objects of this invention are the provision of a check-protector attached to an adding machine having connecting parts operable from a general operator whereby the check-protector will be actuated simultaneously upon the movement thereof, and wherein the key board of the adding machine is used for selecting the desired type characters of a series of type carriers differentially moved in fixed paths, whereby in one stroke of the general operator the selected characters are positioned in a printing line and impressed upon a check and restored to normal resting or their zero position upon the reverse stroke thereof, to provide improved means for reversing the movement of the carriers in the higher denominational order of the selected keys for automatically positioning symbols on the carriers in the printing line.

A further object is the provision of an inking means for depositing ink only on the selected type characters and the symbols positioned in the printing line upon the operating stroke of the general operator, to provide improved means connecting the attached mechanism with the general operator permitting the sequential movement of said mechanism whereby the carriers are moved in a fixed path, positioning the selected type in the printing line, to provide motion-transmitting means for reversing all of the unselected carriers in the higher denominational order of the ones selected for positioning symbols in the printing line, to provide a carriage normally spaced from and movable into said printing line for imprinting and embossing upon a check all of the characters selected by the keys and the symbols automatically positioned in the printing line.

A still further object is the provision of a plurality of keys adapted to be manually operated, having means coacting therewith for releasably holding racks each having connecting engagement with the type carriers and normally held under spring tension whereby upon a partial movement of the general operator, the released racks will be drawn under their own power for positioning the selected type of the carriers in a printing line, while a further movement of the general operator and its connections with the attached mechanism will sequentially move the parts for setting up the selected type and the symbols in the printing line, to provide means whereby the mechanism may be rendered operable and inoperable with the adding machine while being attached thereto.

To the foregoing and other ends, which will appear from the following description in detail of the preferred embodiment of this invention, the invention consists in the features of construction, arrangement of parts, and combination of devices set forth in the specification and particularly pointed out in the appended claims.

In the accompanying drawings embodying my invention, I show my device as being attached to one end of an adding machine, but I do not wish to be limited to the operation and action solely to an attachment, as it will be readily seen that the device may be a separate unit embodying operating parts similar to those of the adding machine for setting up and actuating the device, and in such a machine it may be found desirable to omit the recording and totalizing features of the adding machine, while all of the features embodied in these improvements will be substantially the same.

Fig. 4 is an enlarged detail sectional view showing a portion of an aligning segment and my device attached thereto;

Fig. 5 is a view substantially the same as Fig. 4 illustrating a changed position of one of the driving means for the carrier;

Fig. 6 is a detail sectional view taken on the line 6—6 of Fig. 3 illustrating one of the single-movement carriers;

Fig. 7 is a view substantially the same as Fig. 6 illustrating a changed position of one of the controls or motion-transmitting means;

Fig. 9 is an enlarged detail view of the means for operatively connecting and disconnecting the device;

Figure 1:
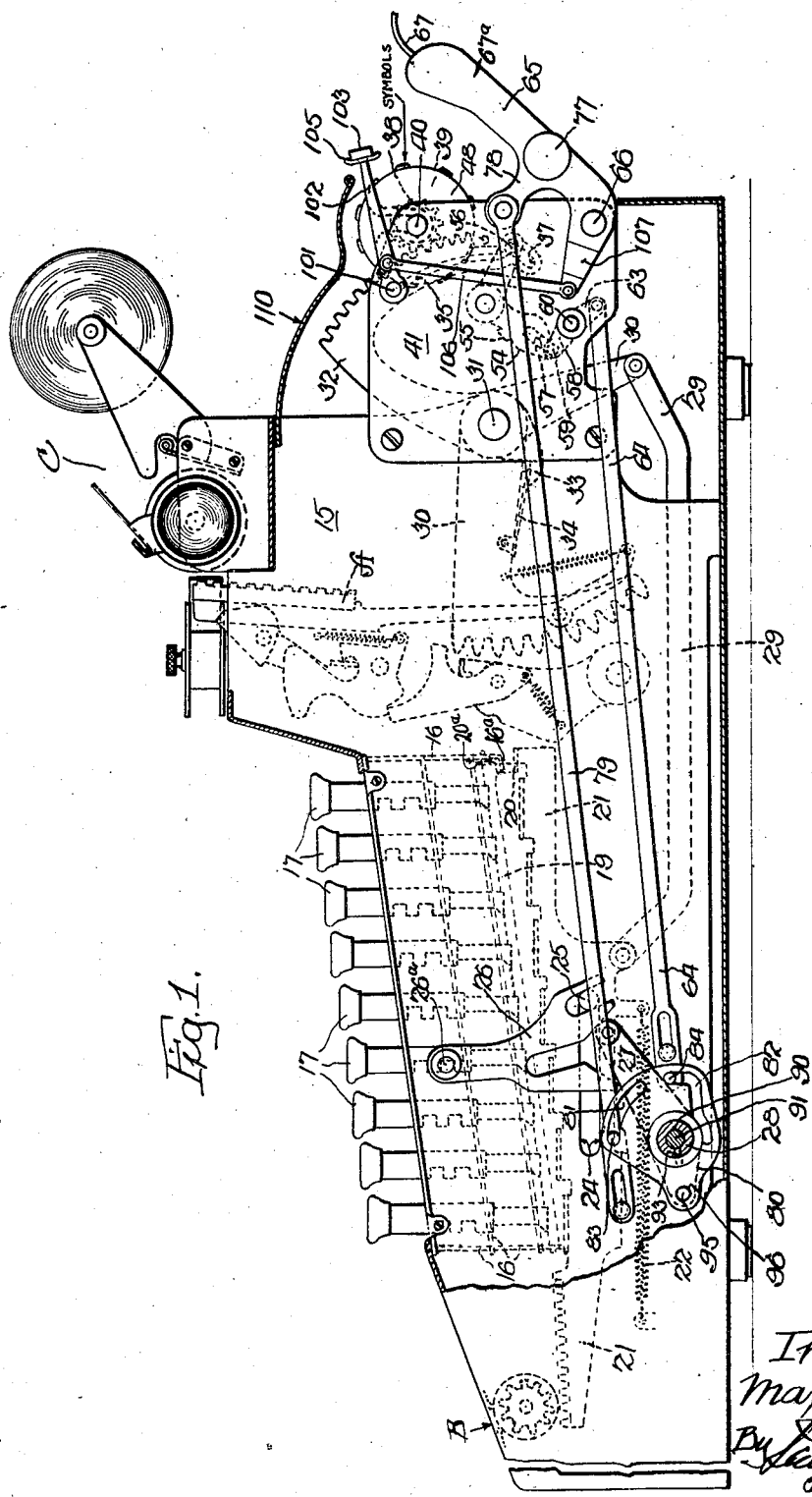
Figure 1 is a longitudinal sectional view of an adding machine with the side wall broken away showing my device attached thereto.

As shown in these views, the device is attached to the main frame side plates 15 of an adding machine provided with a key board frame member 16 in which a plurality of vertically-positioned keys 17 are adapted to be normally held in readily-operable position by means of the compression springs 18 coacting with each key. The keys 17 are adapted to be manually operated for selecting the desired characters and effecting the release of certain retaining members 19 pivotally supported on the frame 16 below each row of keys. The retaining members 19 are mounted for substantially horizontal rocking movements and are yieldingly held against a stop 16a on the frame 16 by means of a spring 20a. Each retaining member 19 is provided with an extension 20 for engaging an adding rack 21 slidably mounted on the main frame 15 and normally adapted for a forward sliding movement by means of the tension springs 22 attached thereto and to the main frame 15. Each of these racks 21 are provided with a horizontally-extending elongated slot 23, and each side of the main frame 15 is also provided with an elongated slot 24 aligned with the slots 23 of the racks. When the racks 21 are released from their respective retaining members 19 by means of the keys 17, they are withheld from sliding movement under the influence of the tension springs 22 by means of a horizontally-disposed rod 25 extending through the elongated slots 23 of the racks and the slots 24 of the main frame 15.

The rod 25 is adapted to be freely moved in these slots by means of a pair of bifurcated arms 26 connected to each end thereof and pivotally mounted at 26a on each side of the main frame 15, and actuated for a swinging movement by means of the arms 27 fixed to a general operator shaft 28.

A connecting link 29 is pivotally attached to each of the adding racks 21 and to a corresponding number of aligning segments 30 pivotally mounted on a horizontally-disposed shaft 31 fixed in the main frame 15. These links actuate the mechanism in the usual manner for the vertical positioning of the type bars A and actuating the totalizer B of the adding machine.

Pivotally mounted on the shaft 31 adjacent each aligning segment 30 is a driving segment 32 provided with an extension 33 engaging the aligning segment and yieldingly held in driving relation therewith by means of a leaf spring 34 fixed to the segment 30 and engaging the extensions 33, permitting a positive movement of the driving segment 32 in one direction and a yieldable independent movement in the other direction thereof. The segments 32 are each provided with a concentric arcuate slot 35 terminating into an angular outwardly-extending arcuate slot 36 providing a shoulder 36a near the lower end thereof and which extends into an angular inwardly-extending arcuate slot 37 (see Figs. 4 and 5). Each of the segments 32 being the same, it is thought that a description of one will suffice for a description of all. The driving segment 32 is in meshing engagement with a pinion gear 38 securely attached to or integral with a type-carrier 39 having a set of fixed type thereon and being pivotally mounted on a horizontally-disposed shaft 40 secured in a pair of side plates 41 attached to the main frame 15 of the adding machine.

A pair of segments 42 and 43 respectively having relatively few teeth thereon are also pivotally mounted on the shaft 31 and are adjacent to and free from engagement with the aligning segments 30 and in meshing engagement with the pinion gears 44 and 45 respectively fixed to or integral with the carriers 46 and 47 respectively, which are adapted to be moved at various times by the segments 42 and 43, as will be more clearly explained as the description proceeds.

Figure 3:
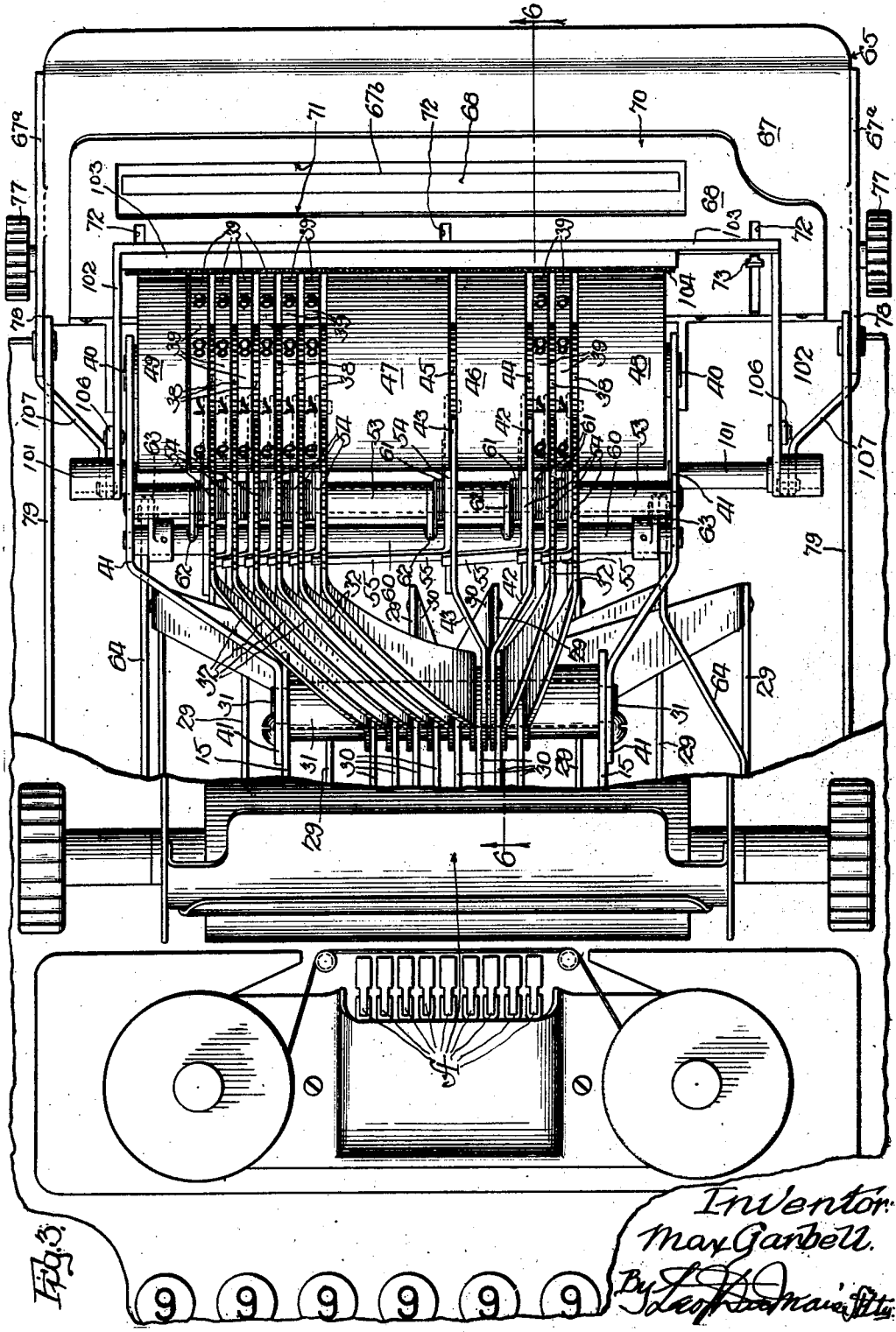
Fig. 3 is a top plan view of a portion of the machine broken away substantially on the line 3—3 of Fig. 2.

Fixed to each end of the shaft 40 and adjacent the side plates 41 are members 48 and 49 (see Fig. 3) provided with type characters thereon positioned in a common printing line, while the carriers 46 and 47 have a set of type characters thereon normally in the printing line and a set also adapted to be positioned in the printing line by means of the segments 42 and 43 respectively.

The segments 42 and 43 are provided at their free ends below the teeth thereof with an arcuate slot 50 and are yieldingly held in normal position by means of the tension springs 51 attached to said segments and to the collar or washers 52 supported on a horizontally-disposed shaft 53 fixed in the side plates 41, thereby holding the segments 42 and 43 in a resting position on the collars 52.

On the shaft 53 are a plurality of bell cranks or control members 54 pivotally mounted for rocking movements with and independently of all the segments 32 and the segments 42 and 43, each being provided with an extending finger portion 55 which is adapted to overlie the adjacent bell crank to the left (as viewed in the drawings), thereby causing them to be movable as a unit in one direction of movement and to be free of each other in the other direction of movement. These bell cranks or control members will be referred to as a whole from time to time as motion-transmitting means. Each bell crank or control member 54 is also provided with a follower 56 fixed thereto and adapted to freely ride in the arcuate slots 37 and 50 of the segments 32, 42 and 43, while the free ends of the bell cranks are forked providing an open slot 57.

An actuator comprising a plurality of rock arms 58 each provided with extending pins 59 are mounted for rocking movement with a horizontally extending shaft 60 pivotally mounted in the side plates 41. The pins 59 are positioned to readily engage each of the slot openings 57 in the bell cranks 54 and are adapted to be held in a normal position by means of a spring 61 engaging one leg of the bell crank and secured into an arm 62 fixed to the stationary shaft 53. The rocker arms 58 fixed to the shaft 60 are movable by means of a depending arm 63 fixed to each end of the shaft and pivotally attached to a connecting link 64 which extends forwardly and is controlled by the movement of the general operator shaft 28.

As thus far described, upon the movement of the selected keys 17, the retaining bar 19 coacting therewith will be released from the adding racks 21 rendering those racks readily operable by means of the tension springs 22 and upon the movement of the general operator shaft 28 the bifurcated members 26 will cause the rod 25 to be moved forwardly in the slot 24 of the side frame and also in the slots 23 of the remaining adding racks 21 that have not been selected by the keys. The selected racks 21 will move the connecting links 29 thereby rocking the aligning segments 30 to their respective positions for selecting the type of the adding machine and also adjusting the driving segments 32 and rotating the pinions 38 and the carriers 39 for positioning the type thereon in a printing line. All of the selected driving segments will rock on the shaft 31, the shoulder 36a at the lower end of the arcuate slot 35 abutting the follower 56 will cause the bell crank arm to be rocked downwardly a given distance until the pin rides in the slot 35 permitting a free movement of the segments. As the bell cranks 54 are rocked by the driving segments 32, the slotted end 57 thereof will be moved out of the path of the pins 59 of the actuator. (See Fig. 5.) While all of the unselected racks 21 remain in their locked positions, no movement of the segments 32 and their respective bell cranks 54 will occur, thereby permitting the forked portions 57 to remain in the path of the pins 59 of the actuator, whereby upon a given movement of the general operator shaft 28 the links 64 will rock the shaft 60 and the arms 58 causing the pins 59 to engage and rock the remaining bell cranks 54 a given distance in the reverse direction, causing the reverse movement of all of the carriers in the higher denominational order of the selected keys and coacting parts by means of the extending finger portions 55 of the bell cranks (see Figs. 3 and 8).

The bell cranks 54 while in their normal position are free to swing a given distance, that is to say the followers 56 thereon are free to move in the arcuate slots 37 and 50 without effecting the movement of the segments 32, 42 and 43 (see Figs. 4 and 6). When the segments 32 are moved to a changed position the coacting bell cranks 54 will also be moved, while the segments 42 and 43 are actuated only in a reverse direction, dependent upon the movement of the bell cranks 54 under the control of the actuator arms 58 and 59 by means of the connecting links 64.

A carriage 65 is pivotally mounted on a horizontally-extending shaft 66 secured to the lower edge portions of the side plates 41 and is provided with a relatively flat plate-like rest portion 67 having an elongated slot opening 67b extending across the printing line in which a spring-pressed cushion or impact bar 68 is positioned and normally held flush with the face of the plate 67 by means of compression springs 69. A relatively thin guide plate 70 is secured to the lowermost portion of the plate 67 and is provided with a horizontally-extending elongated opening 71 positioned directly over the bar 68 which is sufficiently wide to permit for clearance of the carriers while an impression is made (see Fig. 5). A plurality of substantially vertically-extending slots 72 are also provided in the guide plate 70 below the opening 71 into each of which an adjustable guide or check support 73 is provided, having rack teeth 74 thereon in meshing engagement with a pinion 75 fixed to a shaft 76 journaled in the side walls 67a of the carriage 65.

A pair of twirler knobs 77 are fixed to each end of the shaft 76 outwardly of the side walls 67a for manually adjusting the supports 73 to properly position that portion of a check on which the impression is to be made.

The carriage 65 is provided with a pair of extending arms or brackets 78 to which a pair of connecting links 79 are pivotally attached and which extend forwardly and are connected to the general operator shaft 28.

Figure 2:
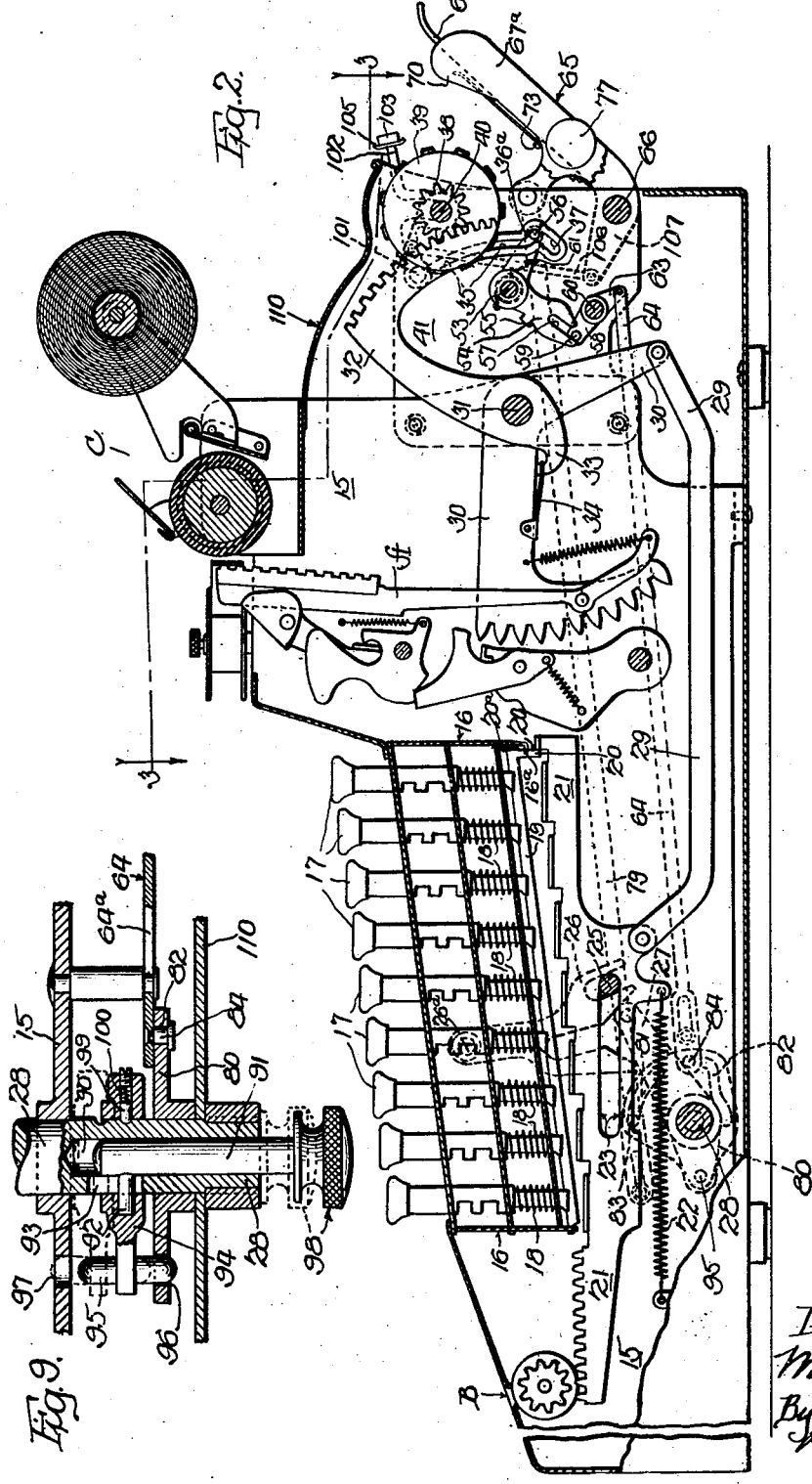
Fig. 2 is a longitudinal medial sectional view through the adding machine embodying my improvements.

The general operator shaft 28 has a cam 80 fixed at each end thereof which is provided with a concentric cam slot 81 and a cam slot 82 having an angular movement therein. The connecting link 79 is provided with a follower 83 extending into the cam slot 81 and the connecting link 64 is provided with a follower 84 extending into the cam slot 82, thereby connecting the links 79 and 64 of the device with the cam 80 for operation under the control of the general operator. The cam slot 84 is provided with a dwell permitting a free movement of the shaft 28 for a given distance before engaging the angular portion thereof, while the cam slot 83 permits of a greater movement of the shaft 28 (see Figs. 1 and 2).

During this free movement of the general operator shaft 28 all of the racks 21 released by the depression of the selected keys are caused to move forwardly by means of the spring 22, at the same rate of speed as that of the rod 25 which is being carried by the bifurcated arms 26 upon the movement of the arms 27, which in turn, by means of the connecting links 29, will rock the aligning segments 30 for setting up the type of the adding machine and the driving segments 32 of the attached mechanism.

In this movement of the segments 32, the shoulders 36a will cause the followers 56 to rock the bell crank 54 and the slot opening 57 therein out of the path of the pin 59 of the actuator operatively connected to the cam 80 by means of the link 64. This partial movement of the actuator shaft 28 causes a partial movement of the driving racks and renders all of the bell cranks or control members coacting therewith inoperable.

Upon a further movement of the shaft 28, the links 64 will rock the shaft 60 whereupon the pins 59 will enter the slot openings 57 of the remaining bell cranks 54 (see Figs. 4 and 5) causing a counter-clockwise rocking movement thereof and a reverse movement of the driving segments and the carriers in meshing engagement therewith, positioning the symbols that are normally above the printing line.

As the shaft 28 continues in its movement, a free and complete setting up of the selected type carriers will be had, and under the control of the tension springs 22 the racks 21 will be brought to their respective stops. The coacting bell cranks 54 will also engage the segments 42 and 43, causing a like motion thereto and a reverse movement of the carriers 46 and 47 only when the figures selected by the keys are in the fractions or cents. The carriage 65 will then be rocked by means of the links 79 for imprinting upon a check the characters selected and the symbols automatically set up in the printing line. In this manner of moving the carriage toward the type carriers, the printing and the impression upon the check is a forced impression and not an impact.

Fixed to the side plates 41 and extending outwardly on each side thereof are studs or shafts 101 on which the arms 102 are pivotally mounted and which carry a channel-shaped horizontally extending bar 103 with the open side of the channel facing the type carriers. The open side of the channel bar 103 is filled with an ink absorbing material 104 which is covered with a resilient material 105, such as felt or the like.

Pivotally connected to the arms 102 are a pair of links 106 which extend downwardly and are connected to the extending arms 107 provided at the lower portion of the carriage 65.

As the carriage 65 is rocked toward the carriers, a pull will be exerted on the links 106 and the arms 102, causing the channel bar 103 to swing downwardly and the material 105 to wipe the face of the type in the printing line only, as the pivotal center 101 is inwardly of the pivotal center 40 of the carriers and is caused to swing on a greater arc.

It is sometimes desirable to use the machine without the attachment, and for that purpose I have provided a means whereby the device may be rendered inoperable. The general operator shaft 28 is provided with a bored opening 90 into which a rod 91 is slidably mounted having a pin 92 that extends through and is guided in an elongated slot 93. Slidably mounted on the shaft 28 is a collar 94 provided with a cross pin 95 adapted to engage an aperture 96 in the cam 80 and an aperture 97 in the main frame 15. As shown in Fig. 9 this connecting device is illustrated in full lines in operable position with the adding machine, and inoperable in dotted lines. This mechanism is operated by means of a finger grip or knob 98 fixed to the rod 91 for causing a sliding movement of the collar 94 for positioning the cross pin 95 in or out of engagement with the opening 96 in the cam 80, and when thus positioned the plunger 99, under the tension of the spring 100, will engage an indentation in the shaft 28, to prevent the accidental disconnection of the device.

All of the carriers movable under the control of the keys are provided with a zero or cipher position, that is the carriers are provided with a set of numeral type ranging from zero to nine and a symbol between the nine and zero, and when at rest the zeros of these carriers are normally in the printing line.

In selecting numerals by means of the keys of the key board, as for example (see Fig. 10) the line shown indicating "Pay * * * 1030 Dollars and 24 Cents" it was only necessary to select the keys numbered 1, 3, 2 and 4. In so doing, the segments D, E, F and G (see Fig. 8) were the ones actuated upon a partial movement of the general operator, thereby causing all of the bell cranks 54 to the right of segment D to be rocked on the shaft 53 and out of the path of the actuator arms 58 and pins 59 by means of the extending finger portions 55. As the actuator arms 58 are then rocked, the pins 59 have engaged and rocked all of the remaining bell cranks to the left of the segment D, thereby raising the cooperating segments 32 against the tension of the springs 34, which caused a reverse movement of the carriers meshing therewith, and positioned the symbols in the printing line in front of the selected characters.

The words "Pay" and "Cents" are rigidly fixed in the printing line and will always appear with the various set-ups of the characters, while the words "Dollars" and "And" on the carriers 47 and 46 respectively are movable into and out of the printing line. These carriers 47 and 46 are yieldingly held in a fixed position by means of the springs 51 and are movable only in a reverse direction by means of the segments 43 and 42 respectively, operated by the bell cranks 54 upon the movement of shaft 60.

Figures 8, 10, 11:
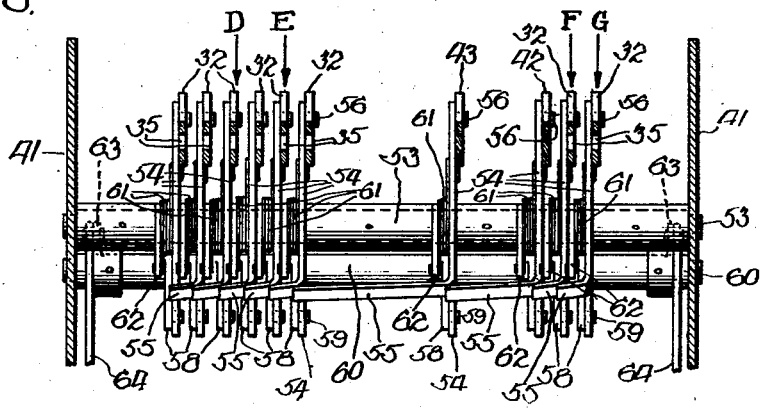
Fig. 8 is a partial plan section taken substantially on the line 8—8 of Fig. 4 showing the connecting means of the motion-transmitting means with each other.
Fig. 10 is a view of a check, having been embossed, printed and perforated with my improved device, illustrating the same when characters are used denoting dollars and cents.
Fig. 11 is a view similar to Fig. 9 illustrating a check imprinted wherein only the characters denoting the cents or fractions are used.

In Fig. 11, an amount is shown indicating "Pay * * * Only 24 Cents," and in this instance the keys numbered 2 and 4 of the fractions were selected, and in so doing the segments F and G were actuated upon a partial movement of the general operator, causing the bell crank 54 connected therewith to be rocked out of the path of the actuator arms 58 and the pins 59. The rocking movement of the actuator arms 58 caused the pins 59 to rock all of the remaining bell cranks to the left of segment F, thereby raising all those segments against the tension of the springs 34 and also the segments 42 and 43, which caused a reverse movement of all of the carriers and positioned the symbols and the word "Only" in the printing line with the selected numerals 2 and 4. The carriers 46 and 47 are provided with only two rows of type characters, the one being normally in the printing line, while the other is brought into the printing line upon the reverse movement of the carriers.

To protect the mechanism, a cover plate 110 is provided attached to the main frame 15 and extends downwardly on each side to the base of the adding machine.

The general parts which are common to the adding machine and which have no function with the attached mechanism, such as the type bars A, the totalizer B and the platen and paper roll marked C, may be used when a record of the amounts of various checks is to be kept, the parts A and C will furnish a permanent record, while the totalizer B will furnish a total of these amounts, which may be seen at a glance as is common in an adding machine of this type.

I contemplate as being included in these improvements all such changes, variations and departures from what is thus specifically illustrated and dscribed as fall within the scope of the appended claims.

I claim:

1. A key-set check writer having, in combination, a plurality of fixed type members arranged in a printing position, a series of type carriers each provided with a set of fixed types adapted to be selectively moved in printing position, means for driving the carriers for differential movements in fixed paths to position selected types in a common printing position in accordance with the setting of the keys, means for reversing the driving means for causing invariable movements of the carriers, and means coacting with the driving means for rendering the reversing means inoperable.

2. A key-set check writer having, in combination, a plurality of fixed type members arranged in a printing position, a series of type carriers positioned between said fixed members each provided with a set of fixed types adapted to be selectively positioned in printing position, means for driving the carriers for differential movement in fixed paths to position types in accordance with the setting of the keys in printing position with the fixed members, reversing means associated with the driving means for reversing the movement of the carriers, and means associated with the driving means for selectively rendering the reversing means inoperable in the lower denominational order of the keys depressed.

3. A key-set check writer having, in combination, fixed type members in a printing line, a series of type carriers each provided with a set of fixed types adapted to be selectively positioned in the printing line, driving means for each of said carriers for differential movement in fixed paths to position types in the printing line in accordance with the setting of the keys, a reverse mechanism engaging the driving means for reversing the same, an actuator engaging the reverse mechanism, and means coacting with the driving means and the reverse mechanism whereby the reverse mechanism of lower denominational order of the first key depressed will be free of the actuator.

4. A device of the character described, comprising in combination, fixed type members in a printing line, a series of type carriers each provided with fixed types adapted to be selectively positioned in the printing line, driving means for each of said carriers for differential movement in fixed paths to position selected types in the printing line, a reverse mechanism engaging each driving means for causing invariable movement of the carriers, an actuator operatively connecting each reverse mechanism, and means on each driving means for rendering the reverse mechanism of lower denominational order of the first key depressed free of the actuator.

5. A device of the character described, comprising in combination, a general operator, fixed type members in a printing line, a series of type carriers provided with fixed type thereon and adapted to be brought into register with the printing line by movement of the general operator, manually operable key means for selecting the type of said carriers, and means associated with the carriers for reversing the movement thereof in the higher denominational order of the first key depressed.

6. A device of the character described, comprising in combination, a general operator, a series of carriers provided with fixed type thereon and having driving connections with the general operator for positioning type in a printing line, manually operable key means for selecting the type, bell cranks associated with each driving connection and with each other, an actuator cooperating with each bell crank whereby to reverse the movement of the driving connection and carriers, and means on the driving connections for moving the bell cranks free of the actuator.

7. A device of the character described, comprising in combination, a general operator, a series of carriers provided with type thereon and having driving connections with the general operator for positioning type in a printing line, manually operable key means for selecting the type, a carriage extending across the printing line and normally spaced therefrom, an inking means adapted to move over the type in the printing line, and means under the control of the general operator for actuating the inking means and moving the carriage against said type.

8. A check writer having, in combination, a general operator, a series of carriers provided with fixed type thereon, driving means for each carrier and having driving connections with the general operator for positioning type on the carriers respectively in a printing line, manually operable key means for selecting the type, motion-transmitting means associated with each driving means, an actuator cooperating with each motion-transmitting means whereby to reverse the movement of the driving means, and means on the driving means for positioning the motion-transmitting means free of the actuator.

9. A device of the character described, comprising in combination, a general operator, fixed type members in a printing line, a series of type carriers provided with fixed type thereon and having a driving connection with the general operator for positioning type in the printing line, manually operable key means for selecting the type, and means associated with the driving connections for reversing the movement of each of the driving connections and carriers in the highest denominational order of the first key depressed.

10. A key-set check writer having, in combination, a general operator, a series of type carriers, driving means for each type carrier, a driving element yieldingly connecting each driving means and operable with the general operator for positioning the type carriers in a printing line in accordance with the setting of the keys, motion-transmitting means associated with each other and the driving means for reversing the movement of said driving means, and means whereby all of the motion-transmitting means are inoperatively connecting the driving means in the lower denominational order of the keys actuated.

11. A key-set check writer having, in combination, a general operator, fixed type members in a printing line, a series of type carriers, driving means for each type carrier, a driving element yieldingly connecting each driving means and operable with the general operator for positioning the selected type in the printing line in accordance with the setting of the keys, an actuator, motion-transmitting means engaging the actuator and yieldingly associated with the driving means for reversing the movement thereof, and means whereby the motion-transmitting means are rendered inoperative with the actuator by the driving means of the highest denominational order of the keys actuated.

12. A key-set check writer having, in combination, a general operator, fixed type members in a printing line, a series of pivotally mounted type carriers, driving segments for each type carrier, a driving element yieldingly connecting each driving segment and operable with the general operator for positioning the selected type in the printing line by the setting of the keys, an actuator mounted for rocking movements, motion-transmitting means yieldingly and operatively connected to the driving segments and the actuator, and driving connections whereby said driving segments and actuator are moved sequentially respectively for rendering the actuator inactive in the lower denominational order of the keys selected.

13. A key-set check writer having, in combination, a general operator, fixed type members in a printing line, a series of type carriers provided with a set of type thereon, driving mechanism operable by the general operator for positioning the key selected type of the carriers in the printing line, control members for said driving mechanism, means for actuating said control members individually, and means for selectively rendering the control members inactive with the driving mechanism.

14. A key-set check writer having, in combination, a general operator, type members fixed in a printing line, a series of type carriers provided with type thereon, a driving mechanism operable by the general operator for positioning the key selected type of the carriers in the printing line, control members for said driving mechanism, an actuator for each control member, means for selectively rendering the control members inoperable with the actuator, and means connected to the general operator for actuating said last-mentioned means.

15. A key-set check writer having, in combination, a general operator, fixed type members in a printing line, a series of type carriers, a driving mechanism operable by the general operator for positioning the key selected type of the carriers in the printing line, motion-transmitting means for the driving mechanism adapted to be controlled by said driving mechanism, an actuator arranged to engage the motion-transmitting means, and means for rendering said motion-transmitting means inoperable with the driving mechanism.

16. A key-set check writer having, in combination, a general operator, fixed type members in a printing line, a series of type carriers, a driving mechanism operable by the general operator for positioning the key selected type of the carriers in the printing line, control members selectively operable with the driving mechanism, an actuator for each control member, connections between the actuator and the general operator adapted to actuate the control members subsequent to a partial movement of the driving mechanism.

17. A key-set check writer having, in combination, a general operator, a series of type carriers provided with type thereon, a driving mechanism operable under the control of the general operator for positioning the key selected type in a printing line, an actuator mounted for rocking movements, control means operatively connecting the driving mechanism with the actuator to cause the former to move with the latter to inactive position, and means carried by the control means to move the said control means of lower denominational order to inactive position.

18. A key-set check writer having, in combination, a general operator, a series of type carriers provided with type thereon, a driving mechanism for each carrier operable under the control of the general operator for positioning the key selected type in a printing line, an actuator mounted for rocking movements, motion-transmitting means operatively connecting the driving mechanism with the said actuator to cause the former to move with the latter to inactive position, and means carried by the motion-transmitting means to move the said motion-transmitting means of lower denominational order to inactive position with respect to the actuator.

19. A key-set check writer having, in combination, a general operator, a series of type carriers provided with type thereon, driving means for each of the type carriers under the control of the general operator, setting racks for each of the driving means, said setting racks determining the operation of the driving means, and means whereby upon the movement of the general operator said carriers will be gradually moved therewith to their respective positions to position the selected type of the carriers in a printing line.

20. A key-set check writer having, in combination, a general operator, fixed type members in a printing line, a series of type carriers, driving means operable by the general operator for positioning the key selected type of the carriers in the printing line, motion-transmitting means coacting with the driving means, and means whereby the driving means of the carriers of the non-selected type in the lower denominational order are free of said motion-transmitting means upon the movement of said general operator.

21. A key-set check writer having, in combination, a general operator, fixed type members in a printing line, a series of type carriers provided with type thereon adapted to be selected by the setting of the keys, driving means for each carrier adapted to move in a given direction, motion-transmitting means for reversing the movement of said driving means, and means connecting the general operator to actuate the driving means of said selected carriers for positioning the selected type thereon in the printing line and thereby rendering the motion-transmitting means inoperable in the lower denominational order of the set keys.

22. A key-set check writer having, in combination, a general operator, type members in a printing line, a series of pivotally-mounted type carriers provided with a set of type thereon, driving segments for positioning the selected type of each type carrier in the printing line, inking means adapted to move across the printing line, a carriage for the check to be printed and being spaced from and adapted to move into the printing line, driving connections operable by the general operator for moving the elements sequentially and permitting a complete set-up of the selected types and inking the same in advance of the printing of the check.

23. A key-set check writer having, in combination, a general operator, fixed type members in a printing line, a series of pivotally-mounted type carriers provided with type thereon, driving segments for the type carriers to position the selected type thereon in a printing line, a plurality of motion-transmitting members movable with and independently of each other and yieldingly and operatively connecting the driving segments, an actuator engaging the motion-transmitting members, and driving connections operable by the movement of the general operator whereby the driving segments and the actuator are moved sequentially respectively for rendering the actuator inoperable with said motion-transmitting means in the lower denominational order of the selected keys.

24. A key-set check writer having, in combination, a general operator, fixed type members in a printing line, a series of pivotally-mounted type carriers, driving segments for the type carriers to position the selected type thereon in a printing line, a plurality of motion-transmitting members movable with and independently of each other and yieldingly and operatively connecting the driving segments, an actuator engaging the motion-transmitting members, and driving connections operable by the movement of the general operator whereby the driving segments and the actuator are moved sequentially respectively, permitting the advance movement of the driving segments and the carriers in the lower denominational order of the selected keys, rendering the actuator operable with the motion-transmitting members in the higher denominational order of said selected keys.

25. A key-set check-writer having, in combination, a general operator, type members in a printing line, a series of rotatably mounted type carriers, driving segments for rotating each carrier for positioning the key selected and certain type of each carrier in a printing line, motion-transmitting members movable with and independently of each other and the driving segments, an actuator associated with the motion-transmitting members, and driving connections operable by the movement of the general operator for sequentially driving the segments and moving the actuator respectively corresponding to the selected keys.

26. A key-set check-writer having, in combination, a general operator, fixed type members in a printing line, a series of rotatably mounted type and symbol carriers, driving segments for rotating each carrier for positioning the key selected and certain type of each carrier in a printing line, motion-transmitting members movable with and independently of each other and the driving segments, said motion-transmitting members having means engaging the next one of the lower denominational order, an actuator associated with the motion-transmitting members, said actuator engaging an inking means adapted to move across the type in the printing line, a carriage extending across the printing line and normally spaced therefrom, and driving connections operable by the movement of the general operator for sequentially setting up the type and symbols and actuating the carriage against the said type in the printing line.

27. A key-set check-writer having, in combination, a general operator, fixed type members in a printing line, a series of rotatably mounted type carriers, driving segments for each carrier for positioning the selected type thereon in a printing line, motion-transmitting members movable with and independently of each other and the driving segments, an actuator associated with the motion-transmitting members, and driving connections operable by the movement of the general operator whereby the segments and the actuator are moved sequentially respectively.

28. A key-set check-writer having, in combination, fixed type members in a printing line, a series of type carriers each provided with a set of fixed types, driving means actuating the carriers for movements in fixed paths to position types in the printing line in accordance with the setting of the keys, an actuator associated with the driving means positioning the selected type of the carriers in the printing line, and a carriage movable into co-operative relation with the printing line for taking an impression of the selected type.

29. A key-set check-writer having, in combination, fixed type members in printing position, a series of rotatably mounted type carriers provided with a set of type thereon, means for rotating the carriers for positioning the selected type thereof in printing position, and means associated with the carriers for positioning certain type of the carriers in printing position in both the higher and the lower denominational order of the keys depressed.

30. A key-set check-writer having, in combination, a general operator, type members in printing position, a series of pivotally mounted type carriers provided with fixed type thereon and having a driving connection with the general operator for positioning type in printing position, manually operable key means for selecting the type, a carriage extending across the printing position and normally spaced from the carriers, inking means adapted to move over the type in the printing position, and means under the control of the general operator for sequentially positioning the selected and certain of the unselected type in printing position and actuating the inking means and moving the carriage against said type for taking an impression thereof.

MAX GARBELL.